(12) United States Patent
Baatz et al.

(10) Patent No.: US 7,689,629 B1
(45) Date of Patent: Mar. 30, 2010

(54) METHOD OF THE USE OF FRACTAL SEMANTIC NETWORKS FOR ALL TYPES OF DATABASE APPLICATIONS

(75) Inventors: Martin Baatz, Stamforge (DE); Günter Schmidt, Unterhaching (DE); Andrej Kharadi, Berlin (DE)

(73) Assignee: Definiens AG, Munich (DE)

( * ) Notice: Subject to any disclaimer, the term of this patent is extended or adjusted under 35 U.S.C. 154(b) by 0 days.

(21) Appl. No.: 09/958,108

(22) PCT Filed: Mar. 30, 2000

(86) PCT No.: PCT/EP00/02828

§ 371 (c)(1),
(2), (4) Date: Jan. 18, 2002

(87) PCT Pub. No.: WO00/60497

PCT Pub. Date: Oct. 12, 2000

(30) Foreign Application Priority Data

Mar. 30, 1999 (DE) ................................. 199 14 326

(51) Int. Cl.
G06F 7/00 (2006.01)
G06F 17/00 (2006.01)
(52) U.S. Cl. ......................................... 707/794; 706/45
(58) Field of Classification Search ................ 707/1, 707/3, 5; 715/43; 709/200–223
See application file for complete search history.

(56) References Cited

U.S. PATENT DOCUMENTS

| | | | |
|---|---|---|---|
| 4,815,005 A | | 3/1989 | Oyanagi |
| 4,868,733 A * | | 9/1989 | Fujisawa et al. ............... 707/5 |
| 4,912,648 A | | 3/1990 | Tyler |
| 5,193,182 A * | | 3/1993 | Bachman et al. ............ 707/100 |
| 5,353,371 A | | 10/1994 | Honiden et al. |
| 5,434,777 A | | 7/1995 | Luciw |
| 5,802,508 A | | 9/1998 | Morgenstern |
| 5,809,212 A * | | 9/1998 | Shasha ........................ 706/46 |
| 5,842,196 A * | | 11/1998 | Agarwal et al. ................ 707/2 |
| 5,870,751 A | | 2/1999 | Trotter |
| 5,905,991 A * | | 5/1999 | Reynolds .................. 715/501.1 |
| 6,151,679 A * | | 11/2000 | Friedman et al. ............... 726/3 |
| 6,182,062 B1 * | | 1/2001 | Fujisawa et al. ............... 707/3 |
| 6,681,017 B1 * | | 1/2004 | Matias et al. ............... 380/277 |
| 6,789,054 B1 | | 9/2004 | Makhlouf |
| 6,944,603 B2 | | 9/2005 | Bergan et al. |
| 7,437,004 B2 * | | 10/2008 | Baatz et al. .................. 382/224 |
| 2002/0188436 A1 | | 12/2002 | Schmidt et al. ................ 704/1 |
| 2004/0205035 A1 | | 10/2004 | Rimoux ....................... 706/14 |

FOREIGN PATENT DOCUMENTS

WO    WO 00/63788 A3    4/1999

OTHER PUBLICATIONS

"Consistent, Yet Anonymous, Web Access with LPWA", Feb. 1999/ vol. 42, No. 2, pp. 42-47, Communications of the ACM.*
Semantic Networks and Associative Databases: Two Approaches to Knowledge Representation and Reasoning (Published by Eo-Peng Lim et al. at Cherkassky University of Minnesota, IEEE Aug. 1992, pp. 31-40).*
EEE Proceedings—1990 Southeastcon, Behind the Inheritance Relations in a Semantic Network, Yang, p. 289-295.
EEE Expert Aug. 1992, XP002129793, "Semantic networks and associative databases: two approaches to knowledge representation and reasoning", Lim, 11 pages.
IEEE 1990; "Navigation Via Similarity: Automatic Linking BAsed on Semantic Closeness", Tudhope, et al., 10 pages.
Pergamon Press, "A Framework for the Comparative Analysis and Evaluation of Knowledge Representation Schemes", R. Bingi, et al., 15 pages.
"Semantic Networks and Associative Databases, Two Approaches . . . ", Lim, E., et al., IEEE Expert, Aug. 1992, pp. 31-40.
"Three Principles of Representation for Semantic Networks", Robert Griffith, ACM Transacations on Database Systems, vol. 7, No. 3, Sep. 1982, pp. 417-442.
"What's ina Semantic Network", J. Allen, et al., Computer Science Department The University ofRochester, pp. 19-27.
D. Jagannathan, et al. "SIM: A Database System Based on the Semantic Data Model", Unisys Corporation, Irvine, CA 92718, © 1988 ACM 0-89791-268-3/88/0006/0046, pp. 46-55.

(Continued)

*Primary Examiner*—Apu M Mofiz
*Assistant Examiner*—Susan Y Chen
(74) *Attorney, Agent, or Firm*—Imperium Patent Works; Darien K. Wallace

(57) ABSTRACT

A method for the use of fractal semantic networks is disclosed, wherein the fractal semantic network contains both semantic units that possess respective information contents as well as link units that describe a relation content that respectively links two semantic units such that the mutual relationship of the two linked semantic units is determined through the relation content. In that case, a knowledge network consists of category units and, as the case may be, additionally of instance units and/or Janus units. For the querying of information, classification and/or selecting of semantic sub-networks in this knowledge network, the networking of semantic units taking into consideration the type, content, composition and/or distance of other semantic units in the respective network environment can be employed. Furthermore, Janus functionality can be employed for the local classification or for the local alteration of the networking of a semantic unit.

12 Claims, No Drawings

OTHER PUBLICATIONS

L.A. Becker, "Network Processing of Hierarchical Knowledge for Classification and Diagnosis," Worcester Polytechnic Institute, Massachusetts, IEEE, Jun. 21, 1987 (pp. II-309 through II-317) doc XP000042313.

P.R. Cohen et al., "Classification by Semantic Matching," University of Massachusetts, Amherst, Feb. 25, 1987 (pp. 566-570) doc XP002152703.

U.S. Appl. No. 09/806,727, filed Jul. 9, 2001, Schmidt et al.

* cited by examiner

METHOD OF THE USE OF FRACTAL SEMANTIC NETWORKS FOR ALL TYPES OF DATABASE APPLICATIONS

The present invention relates to a computer-implemented method for the use of fractal semantic networks for all types of database applications.

For the storage of information, databases or file systems are conventionally used that are closely related to one another.

In this case, data/information are deposited in tables in relational databases, wherein the tables can be linked amongst one another. The entries in the tables comprise both elementary attributes such as e.g. floating point numbers, text and calendar data as well as more complex structured objects such as e.g. image data, audio data etc. For reading out the information, a partially standardized query language (SQL) is used to find and to extract entries with particular elementary attributes. Functions within such a conventional database that alter the attributes or even the structure of the tables are called "stored procedures" and are not standardized.

Further, information can be formulated together with functions as objects of an object-oriented programming language such as e.g. C++, JAVA, small talk, etc. Such conventional systems are designated as object-oriented databases. In this case, more complex structured data/information such as e.g. geometry data of a CAD program can be stored and altered in a very simple manner. The query (information retrieval) is standardized (OQL), in this case, according to attributes and object classes, wherein no object functions are used. However, the definition of the objects (inheritance hierarchy, attributes, functions, etc.) is very static, whence it is exceptionally complicated and impossible during the run time of the database system to alter the definition of an object into a new version.

Contrary thereto, conventional file systems represent the basis for the working of a computer operating system. In these conventional file systems, the data/information are separate from the functions/programs that alter the data. The search for files and programs is consequently limited to simple search terms such as e.g. name, file size, creation date, etc. For navigating in such conventional file systems, usually a hierarchical tree (with cross-references) is used. The individual data/information blocks can contain, in this case, a reference to the program that can process them.

These conventional methods for the storing of information have the disadvantage, however, that they comprise solely a low flexibility and are not particularly associative and are, in part, not object-oriented. Furthermore, it requires a large amount of effort to insert new data into heterogeneous data stocks and/or to keep already integrated data up-to-date.

It is thus an object of the present invention to provide a method for the use of fractal semantic networks for all types of database applications that exhibit a high flexibility, a simple data input, possibilities for automatic updating and a stable and simple finding of data.

In accordance with the invention, this object is achieved via the measures cited in claim 1.

Further advantageous embodiments of the present invention are the subject of the dependent claims.

More precisely stated, in the case of a method in accordance with the invention for the use of fractal semantic networks wherein the fractal semantic network contains both semantic units that respectively possess information contents as well as link units that describe a relation content that respectively links two semantic units such that the mutual relationship of the two linked semantic units is determined via the relation content, a knowledge network consists of category units and, as the case may be, additionally of instance units and/or Janus units and the networking of semantic units taking into consideration the type, content, composition and/or distance of other semantic units in the respective network environment can be employed for queries of information, classification and/or selecting of semantic sub-networks in this knowledge network and Janus functionality can be employed for local classification or for local alteration of the networking of a semantic unit.

In accordance with an embodiment of the present invention, such sub-networks in the knowledge network are selected for the querying of information that are similar to a sub-network formulated using semantic units of the knowledge network.

In accordance with a further embodiment of the present invention, sub-networks that are hung into the knowledge network for extending the knowledge network can be formulated using new instance units, new category units and/or category units already contained in the knowledge network.

In accordance with a further embodiment of the present invention, the hanging in of a new sub-network is additionally automated by altering the links of the semantic units contained in the sub-network with the aid of Janus functionality.

In accordance with a further embodiment of the present invention, the altering of the network or of the information contents can only be carried out via Janus units that possess the corresponding privilege thereto.

In accordance with a further embodiment of the present invention, the semantic units, their information contents, link units and Janus units are represented on several storage media and Janus units of a storage medium can influence Janus units of another storage medium.

In accordance with a further embodiment of the present invention, the Janus units of the semantic units in the network neighborhood can put in a veto against the alteration prior to the altering of a semantic unit.

In accordance with a further embodiment of the present invention, the Janus unit of a semantic unit whose networking and/or content is to be altered stores the networking and/or the content and restores these if appropriate.

In accordance with a further embodiment of the present invention, a unique ID is assigned to each semantic unit and thus also to each link unit, each Janus unit and each content unit of a semantic unit or this ID can be computed.

In accordance with a further embodiment of the present invention, a semantic unit is stored on a data carrier as a collection of ID's.

The description of an embodiment of the present invention follows.

With regard to the fundamental functionality of the database and to the terms "semantic network," "semantic unit," "link unit" and Janus unit" used in this application, reference is made to the application U.S. Publication No, 2002/188,436 (DE-A-199 08 204.9) having the title "$n^{th}$-order fractal network for handling complex structures," wherein the terms "semantic network" and "fractal network" are to be viewed as synonymous. The features disclosed in the aforementioned application with regard to the configuration and the operation of the "fractal network," the "semantic unit"' the link unit" and the "Janus unit" are to be deemed as incorporated into this application by reference.

Generally speaking, a fractal semantic network contains both semantic units that respectively possess information contents as well as link units that describe a relation content that respectively links two semantic units such that the mutual relationship of the two linked semantic units is determined by the relation content.

Relation contents of link units, i.e. respective link types, can, in general, be freely chosen by a user. However, it is useful to define several elementary relation contents of link units in advance in a basic library. Exchange relationships and relations can be viewed as elementary relation contents of link units. Exchange relationships are defined as those types of relationships that describe an abstract, material and/or communicative exchange between semantic units. Relations, on the other hand, are those relation contents of link units that describe some sort of relationship between semantic units. By means of these link units, it is accordingly possible to form a network from semantic units that can comprise superordinate, subordinate and equi-ordinate semantic units.

It is possible to incorporate special semantic units into the fractal semantic network that are capable of carrying out particular operations on other semantic units. These special semantic units are termed hereinafter as Janus units.

In this context, a Janus unit designates a special semantic unit that comprises an algorithm or a collection of algorithms that can alter the information content of semantic units and/or generate new semantic units/destroy existing semantic units. A Janus unit is connected, via a respective special link unit of a type "has Janus/function/is Janus/function of", with one or more semantic units in whose neighborhood the Janus unit is to operate.

This means that a functionality of the Janus unit, i.e. a Janus functionality, is limited such that it is solely capable of carrying out the particular operations of those semantic units that are situated in a predetermined neighborhood region of a semantic unit linked to it. Furthermore, a Janus unit can be linked to other Janus units via one or more link units.

The essential object of a Janus unit is the bundling and contexting of information contents. In this case, bundling is to be understood as the computing of information contents of a semantic unit serving as a center from the information contents of neighboring semantic units. Contexting is to be understood as the analogous inverse operation to bundling, i.e. information contents of neighboring semantic units are altered as a function of the information contents of the semantic unit serving as a center, wherein these define the neighborhood. In this manner, it is possible, for example, to obtain constantly up-to-date statistics of a set of semantic units (bundling)/to convey relevant boundary condition changes to a set of semantic units (contexting).

In the following, classification of a semantic unit is to be understood as: classification of attributes of this semantic unit, also fuzzy classification; and classification of the networking of this semantic unit in a particular network environment taking into consideration the type, content and composition (sub-objects in an embedded hierarchy) of the other semantic units in this network environment.

The specification of an environmental network is carried out through the specification of the corresponding link types, a distance value and an algorithm for the computation of the distance.

Hereinafter, a sub-network can always also be understood as a single semantic unit.

Category units are semantic units that describe a general category/class.

Instance units are semantic units that are a concrete embodiment of one or more categories/classes.

A description of the configuration, the alteration and the extension of a fractal knowledge network for the storage of information follows.

The fractal knowledge network corresponds to the database and consists of the entirety of networked category units, Janus units connected to category units and networked instance units. Category and instance units are semantic units and can thus also be semantic link units.

A description of semantic category units with corresponding attributes follows, which corresponds to a definition of a database scheme.

The category units are networked with one another as described hereinafter.

Janus units (functions and algorithms, e.g. data back-up and comparison, computing of statistics, classification, behavior of the semantic units during user interaction) are defined in the functionality of the Janus units, i.e. the Janus functionality, is assigned to these semantic category units via linking with corresponding semantic category units. In part, this functionality corresponds to the "stored procedures" of a conventional data bank, wherein these are not connected to a category, however.

Input sub-networks in the form of networked instance units are created using predetermined category units. In this case, instance units are linked to the category units via semantic link units of a type "is generally".

As necessary, an additional linking of the thus generated input sub-networks and/or of the instance units contained therein to the knowledge network is carried out. This is carried out automatically with the aid of Janus units and/or manually. The thus generated links can be subsequently altered as necessary.

Through the automatic linking with the aid of Janus units, these Janus units alter the networking of instance units amongst one another and between instance units and category units. In deciding what should be altered, the classification of the instance units and/or their network environment can be carried out in advance. The type and manner of the classification and the algorithm for structure alteration is described, in this case, in the respective Janus unit.

When an instance unit or an input sub-network has been assigned to a particular category unit that itself or whose further generalizations are linked with Janus units, then its functionalities are applied to the respective instance unit/to the respective sub-network and their neighborhood in the network.

A query of information and a selection of sub-networks is described hereinafter.

The querying of information from the database and/or the selection of semantic sub-networks and/or semantic units can be deemed as classification. The input of the query and/or selection criteria is carried out textually and/or through description of a sub-network to be sought using category units and/or instance units of the knowledge network and/or through definition of a particular network environment for classification and/or through definition of a particular network environment for the selection of sub-networks with regard to given semantic units.

A query/selection always returns one or more sub-networks as a result. In the following, a query/selection can, in suit, also be applied to these sub-networks until the desired result is obtained and/or the results no longer change.

The following describes textual input.

A possible form of the query is the textual input of search terms. In this respect, it is essential for the present invention that a search can be carried out not only for logical expressions (for instance: Query("woman" AND "mirror")), but are also for complexly structured terms (for example: "Query(" (Lena with hat) in front of mirror")).

In this type of input, the textual components are linked in a suitable manner with those category units whose name is most fitting (exact or better fuzzy text match). Subsequently, the knowledge network is searched for similar structures. The result of the query then consists of a sequence of found sub-networks that can respectively contain a measure for the similarity to the search query as additional information.

The description of a sought sub-network is described hereinafter.

A further form of the query is carried out through the input of an example. Analogously, to the extension of the knowledge network, a sub-network of instance units of selected category units is formed. This sub-network is filled with the data to be sought and the Janus unit of the classification subsequently determines those locations in the network that fit best to the input sub-network. Again, a list of found sub-networks is output as a result that is optionally provided with a valuation of the fit.

Hereinafter, the selection is described through description of the neighborhood.

Starting from a given semantic unit ("current root"), all the semantic units that meet the given criteria are returned as a selection result. These criteria can be more closely specified as follows: classification of the semantic units to be selected with regard to one or more given semantic units or a sub-network; classification of the semantic link units via which the units to be selected and respectively coming in question are reachable from the "current root" with regard to one or more given semantic link units; specification of the distance of the semantic units to be selected from the "current root." If the distance fulfills a particular criterion, the respectively affected semantic unit is deemed as selected.

It is moreover possible that Janus units can only alter the network and/or its contents when they possess the privilege thereto. In this case, it is advantageous to link the Janus units/their categories to semantic units that administer the user privileges.

Further, the semantic units and their information contents can be stored on different data carriers. This is particularly advantageous when applied as distributed data banks. In this case, the semantic units and their contents can be localized both in the main storage of different computer systems as well as on hard disks and/or other persistent storage media. For the alteration, classification and selection of sub-networks of a distributed stored network, Janus units can be used that influence the Janus units on other storage media.

The Janus units can be designed such that they can put in a veto against an alteration of the contents or the networking in their network neighborhood so that the Janus units that want to effect the alteration are influenced in their operation.

Further, the Janus units can store and, if necessary, restore the current state of their network neighborhood.

It is also possible that semantic units and their contents and Janus units can carry a unique ID or this ID can be computed on demand. It is moreover advantageous when information about the Janus unit that generated the respective semantic unit or the content or the Janus unit is stored in this ID and/or location and/or date of the creation is incorporated into the ID.

Finally, the semantic units, a reference to their content and their networking can be stored as collections of ID's on data carriers. In this case, it is advantageous if information about the current physical location of the corresponding semantic unit and its content can be determined from the ID.

The invention claimed is:

1. A method comprising:
generating a distributed database using a network of semantic units taking into consideration a distance between semantic units in the network of semantic units, wherein those semantic units within the distance belong to a predetermined neighborhood, and wherein a knowledge network is used to query information from the database; and
using a Janus unit to locally alter how a semantic unit is networked in the network of semantic units,
wherein the network of semantic units contains both semantic units that possess information contents as well as link units, each link unit operating to link two semantic units in a hierarchy plane based on relational content, the relational content linking two semantic units such that the mutual relationship of the two linked semantic units is determined through the relational content, wherein the semantic unit is stored on a first storage medium of the distributed database, wherein the information contents of the semantic unit are stored on a second storage medium of the distributed database, wherein the distributed database includes the knowledge network containing networked category units that are a general category describing semantic units and instance units that are a concrete embodiment of one or more categories describing semantic units, and wherein the knowledge network further contains the Janus unit that carries out operations of a stored procedure only on those semantic units in the predetermined neighborhood and that computes bundled information contents of the semantic units in the predetermined neighborhood.

2. The method of claim 1, wherein the querying of information comprises selecting sub-networks in the network of semantic units that are similar to a sub-network formulated using semantic units of the knowledge network.

3. The method of claim 2, further comprising:
extending the knowledge network by formulating sub-networks that are hung into the knowledge network using one of new instance units, new category units and category units already contained in the knowledge network.

4. The method of claim 3, wherein the hanging into of a new sub-network is additionally automated by altering the links of the semantic units contained in the sub-network with the aid of the Janus functionality.

5. The method of claim 4, wherein the Janus unit can alter how the semantic unit is networked in the network of semantic units only if the Janus unit possess the corresponding privilege thereto.

6. The method of claim 5, further comprising:
representing the semantic units, their information contents, the link units and the Janus units on several storage media, and influencing the Janus units of one storage medium by the Janus units of another storage medium.

7. The method of claim 6, further comprising:
vetoing the altering by the Janus unit of how the semantic unit is networked in the network of semantic units.

8. The method of claim 7, wherein the Janus unit of a semantic unit whose one of networking and content are to be altered stores one of the networking and the content and restores these if appropriate.

9. The method of claim 8, further comprising:
assigning a unique ID to each semantic unit, each link unit, each Janus unit and each content unit of a semantic unit.

10. The method of claim 9, further comprising:
storing a semantic unit on a data carrier as a collection of ID's.

11. A method comprising:
generating a distributed database using a network of semantic units and a knowledge network; and
using a Janus unit to locally alter how a semantic unit is networked in the network of semantic units taking into consideration a distance between the semantic unit and other semantic units in the network of semantic units, wherein those semantic units within the distance belong to a predetermined neighborhood, wherein the network of semantic units contains both semantic units that possess information contents as well as link units, wherein the knowledge network contains networked category units that are a general category describing semantic units and instance units that are a concrete embodiment of one or more categories describing semantic units, wherein the Janus unit carries out operations of a stored procedure only on those semantic units in the predetermined neighborhood, and wherein a knowledge network is used to query information from the distributed database.

12. The method of claim 11, wherein the semantic unit is stored on a first storage medium of the distributed database, and wherein the information contents of the semantic unit are stored on a second storage medium of the distributed database.

* * * * *